(12) United States Patent
Kern et al.

(10) Patent No.: US 7,700,015 B2
(45) Date of Patent: Apr. 20, 2010

(54) PROCESS FOR PRODUCTION OF BIAXIALLY ORIENTED FILMS BASED ON CRYSTALLIZABLE THERMOPLASTICS, USING RECYCLED MATERIAL WHOSE MOLECULAR WEIGHT HAS BEEN INCREASED BY CONDENSATION PROCESSES

(75) Inventors: Ulrich Kern, Ingelheim (DE); Ursula Murschall, Nierstein (DE); Bodo Kuhmann, Runkel (DE); Guenther Crass, Taunusstein (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 984 days.

(21) Appl. No.: 11/172,514

(22) Filed: Jun. 30, 2005

(65) Prior Publication Data

US 2006/0004114 A1  Jan. 5, 2006

(30) Foreign Application Priority Data

Jul. 1, 2004 (DE) ........................ 10 2004 031 794

(51) Int. Cl.
*B29B 17/00* (2006.01)
*B29C 47/00* (2006.01)

(52) U.S. Cl. .............................. 264/37.32; 264/173.16; 264/173.18; 264/210.6; 264/210.7; 264/211.12; 264/290.2; 264/920

(58) Field of Classification Search .................. None
See application file for complete search history.

(56) References Cited

U.S. PATENT DOCUMENTS

| 4,392,804 | A | * | 7/1983 | Pushee et al. | 425/174.8 E |
| 5,225,130 | A | * | 7/1993 | Deiringer | 264/102 |
| 7,229,581 | B2 | * | 6/2007 | Kern et al. | 264/173.16 |
| 2002/0136880 | A1 | * | 9/2002 | Murschall et al. | 428/220 |
| 2003/0012937 | A1 | * | 1/2003 | Murschall et al. | 428/220 |
| 2004/0130059 | A1 | * | 7/2004 | Kern et al. | 264/173.16 |

FOREIGN PATENT DOCUMENTS

| DE | 101 05 107 A1 | 8/2002 |
| EP | 0 483 665 A2 | 5/1992 |
| EP | 0 0483 665 A1 | 7/1993 |
| EP | 1 125 970 A2 | 8/2001 |
| EP | 1 418 195 A1 | 5/2004 |
| EP | 1418195 | * 5/2004 |

* cited by examiner

*Primary Examiner*—Jeffrey Wollschlager
(74) *Attorney, Agent, or Firm*—ProPat, L.L.C.

(57) ABSTRACT

A process is described for production of a biaxially oriented film which comprises at one crystallizable thermoplastic as main constituent and comprises at least 500 ppm, based on the weight of thermoplastic, of a pigment. The production process uses at least 20% by weight, based on the weight of the film, of recycled material of the same type whose molecular weight has been increased by condensation processes.

14 Claims, No Drawings

PROCESS FOR PRODUCTION OF BIAXIALLY ORIENTED FILMS BASED ON CRYSTALLIZABLE THERMOPLASTICS, USING RECYCLED MATERIAL WHOSE MOLECULAR WEIGHT HAS BEEN INCREASED BY CONDENSATION PROCESSES

CROSS-REFERENCE TO RELATED APPLICATIONS

This application claims priority to German Patent Application No. 10 2004 031 794.1, filed Jul. 1, 2004, which is hereby incorporated herein by reference in its entirety

FIELD OF THE INVENTION

The invention relates to a process for production of a biaxially oriented film which comprises at least one crystallizable thermoplastic as main constituent and comprises at least 500 ppm, based on the weight of the thermoplastic(s), of a pigment.

BACKGROUND OF THE INVENTION

Biaxially oriented films based on crystallizable thermoplastics are known and widely described. Production of almost all biaxially oriented films uses various proportions of inherent recycled material, and this inherent recycled material is generally produced from cut film inherently produced by the process. Especially in the case of film thicknesses below 4 μm, and also for films of thicknesses more than 300 μm, the use of large proportions of inherent recycled material is critical, because the production of these films often becomes unreliable. In the thickness range from 5 to 300 μm, the proportion of inherent recycled material is generally from 20 to 40%, based on the total weight of the thermoplastics.

In the case of very thin and very thick films, i.e. films which are produced with a proportion of inherent recycled material that is usually low, yields during film production are rather low, and this results in an excess of cut film and therefore of inherent recycled material. This sometimes makes the production of these films uneconomic.

EP-A 0 483 665 discloses a process which uses melt postcondensation to increase molar mass in the treatment of waste polyester materials with various molar masses and finishing specifications. However, the advice given is to avoid using treated polyester in biaxially oriented films which have the highest finishing specification.

EP-A 1 418 195 describes a process for production of a thermoplastic film using recycled material from plastics bottles. The use of these secondary raw materials (recycled material from plastics bottles) is in particular impossible in the case of films in medical applications (lack of traceability) and is subject to limitation in the case of white films. Furthermore, the use of these recycled materials in films intended for food-and-drink applications is not approved in some countries. The recycled materials or flakes based on PET bottles also often comprise other additives, such as isophthalic acid, which can impair the mechanical properties of the films. The use of these secondary raw materials is therefore subject to a limit of at most 50% by weight.

SUMMARY OF THE INVENTION

It was therefore an object of the present invention to provide a process for production of a biaxially oriented film which can use a high proportion of inherent recycled material whose molecular weight has been increased by condensation processes, but which does not impair the properties of the film. The film is not only intended to have good orientability and be capable of reliable production but is in particular intended to have good mechanical and optical properties. Examples of the good optical properties are a homogeneous, streak-free surface over the entire width and length of the film. Among the good mechanical properties are, inter alia, a high modulus of elasticity ($E_{MD}$>3000 N/mm$^2$; $E_{TD}$>4200 N/mm$^2$) and good values for longitudinal (MD=machine direction) or transverse (TD=transverse direction) ultimate tensile strength, MD being >90 N/mm$^2$ and TD being >120 N/mm$^2$. Good orientability and capability for reliable production means that the film is capable of excellent longitudinal and transverse orientation, without break-offs, during its production, and that the finished film has good winding and further-processing performance. Furthermore, the inventive film should be capable of further recycling, in particular without loss of optical and mechanical properties.

DETAILED DESCRIPTION OF THE PREFERRED EMBODIMENTS

This object is achieved via a process for production of a biaxially oriented film which comprises at least one crystallizable thermoplastic as main constituent and comprises at least 500 ppm, based on the weight of the thermoplastic(s), of a pigment, which comprises using, in production of the film, at least 20% by weight of recycled material of the same type whose molecular weight has been increased by condensation processes.

The thickness of the oriented film produced by the inventive process is generally from 2 to 500 μm, preferably from 5 to 350 μm, particularly preferably from 10 to 300 μm. The biaxially oriented film comprises a crystallizable thermoplastic as main constituent.

In the context of the present invention, "crystallizable thermoplastic" means crystallizable homopolymers, crystallizable copolymers, crystallizable compounded materials, crystallizable recycled materials, and other variants of crystallizable thermoplastics. Examples of suitable crystallizable or semicrystalline thermoplastics are polyethylene terephthalate (PET), polybutylene terephthalate (PBT), and polyethylene naphthalate (PEN), polyethylene terephthalate being preferred.

Given a thickness of less than 4 μm, the inventively produced film preferably comprises no more than 50% by weight, preferably from about 30 to 40% by weight, of inherent recycled material whose molecular weight has been increased by condensation processes. In the thickness range from 4 to 300 μm, the proportion of inherently recycled material whose molecular weight has been increased by condensation processes can be up to 100% by weight. A proportion of from 20 to 80% by weight is preferred. Given a thickness of more than 300 μm, the proportion of inherent recycled material whose molecular weight has been increased by condensation processes is advantageously up to 70% by weight. A proportion of from 20 to 60% by weight is preferred.

The film comprises at least one pigment, the proportion of pigment preferably being from about 500 ppm to 25% by weight, based on the weight of the crystallizable thermoplastic. Preferred suitable pigments are titanium dioxide, barium sulfate, calcium carbonate, kaolin, silicon dioxide and also inorganic color pigments and black pigments, preference being given to titanium dioxide (anatase or rutile), barium sulfate, calcium carbonate, and silicon dioxide. The film may also comprise mixtures of two or more different pigments, or mixtures of pigments of the same constitution but different particle size.

Via use of suitable additives, the film can be stabilized with respect to UV radiation, rendered flame-retardant, rendered sealable, coated on one or both sides, rendered resistant to hydrolysis, equipped with antioxidants, chemically pretreated and/or flame-treated. The film may moreover comprise optical brighteners, toning agents such as blue dyes or red dyes, IR absorbers, lubricants, and/or organic dyes for coloring, and may also be rendered thermoformable via selection of suitable copolymers.

The biaxially oriented film may be a single-layer film or else a multilayer film. The film may have been coated with various copolyesters, adhesion promoters, silicone, or silane. In the multilayer embodiment, the film is comprised of at least one core layer and of at least one outer layer, preference particularly being given here to a three-layer A-B-A or A-B-C structure.

The films produced according to the invention may have a symmetrical or asymmetrical structure, and it is possible to use coextrusion here to combine various polyesters, if appropriate also those equipped with additional additives, or polyesters with the same chemical constitution but with different molecular weight and different viscosity. The core layer of the single-layer film and of the multilayer film is preferably comprised of a mixture of virgin raw material, inherent recycled material, and inherent recycled material whose molecular weight has been increased by condensation processes, or of a mixture of virgin raw material and inherent recycled material whose molecular weight has been increased by condensation processes, or of a mixture of inherent recycled material and inherent recycled material whose molecular weight has been increased by condensation processes. The outer layers of the multilayer film may, by way of example, be comprised of polyethylene terephthalate homopolymers, or of polyethylene terephthalate-polyethylene naphthalate copolymers, or of compounded materials.

The thermoplastic single-layer or multilayer film may be produced with identical or differently designed surfaces. For example, pigment may have been added to one surface and not to the other, or all of the layers may comprise pigment particles. Multilayer films are advantageously produced via coextrusion. Known processes may be used to provide a conventional functional coating on one or both surfaces of the film. Finally, based on the weight of the film, a conventional amount of from 0.1 to at most 30% by weight of other raw materials and/or other conventional additives may be added during production of the films.

The drying of the polymers used and the extrusion process cause the viscosity of the polymers to reduce. Because of the additional extrusion step, the viscosity of the recycled material used during the production process, produced in a downstream extrusion step from inherently produced cut film, is naturally lower than the viscosity of the virgin raw material used. The reduction in the viscosity of the inherent recycled material depends not only on the extrusion step but also on the nature and amount of the pigment or of other additives. In the case of highly pigmented films or other complex formulations, the reduction in viscosity of the inherent recycled material may be so high that it becomes impossible to use more than 10% of inherent recycled material. Film production therefore sometimes becomes uneconomic, because of lack of closure of the recycling loop. High-quality recycled materials whose molecular weight has decreased necessarily have to be discarded. If these were reused, the reduction in viscosity would lead to enormous viscosity variations which drastically reduce production stability or even completely prevent production.

This is avoided via the inventive use of inherent recycled material whose molecular weight has been increased by condensation processes. Either melt post-condensation or solid-phase post-condensation may be used as condensation processes to increase the molecular weight of the inherent recycled material. By way of example, solid-phase post-condensation may take place in a fluidized-bed dryer under inert gas at temperatures above 200° C. An example of another method is batchwise solid-phase post-condensation in a tumbling dryer at temperatures above 200° C. at a pressure of less than 10 mbar.

Increasing the molecular weight of the inherent recycled material by condensation processes, substantially or completely reverses the reduction in viscosity. The condensation processes which increase the molecular weight of the recycled material generally increase its standard viscosity SV (DCA) by at least 100, preferably by from 120 to 250. The inherent recycled material whose molecular weight has been increased by condensation processes can therefore be treated in the same way as virgin raw material, and this is of enormous economic importance. The increase in viscosity can be controlled precisely by way of temperature, pressure reduction, and time. Because the inherent recycled material whose molecular weight has been increased by condensation processes is to be treated in the same way as virgin raw material, it is possible to use 100% by weight of inherent recycled material whose molecular weight has been increased by condensation processes in a reliable process to give a biaxially oriented film with a high finishing specification. A film produced in this way can readily be reused in the form of recycled material.

The film is comprised of, by way of example, from 20 to 100% by weight of inherent recycled material whose molecular weight has been increased by condensation processes can (as permitted by thickness) give excellent longitudinal and transverse orientation during its production, without break-offs.

The inherent recycled material whose molecular weight has been increased by condensation processes should, like the virgin raw material, be predried. This predrying includes gradual heating, preferably under reduced pressure (from 20 to 80 mbar, preferably from 30 to 60 mbar, in particular from 40 to 50 mbar) and agitation and, if appropriate, after-drying at a constant, increased temperature, likewise preferably under reduced pressure. The polymers are preferably charged at room temperature from a feed vessel in the desired blend together with the base- and/or outer-layer polymers and, if appropriate, with other raw material components batchwise to a vacuum dryer which, during the course of the drying time or residence time, traverses a temperature profile of from 10° C. to 160° C., preferably from 20° C. to 150° C., in particular from 30° C. to 130° C. During the residence time of about 6 hours, preferably 5 hours, in particular 4 hours, the mixture of raw materials should be agitated at from 10 to 70 rpm, preferably from 15 to 65 rpm, in particular from 20 to 60 rpm. The resultant on precrystallized or predried raw material mixture is after-dried in a downstream vessel, likewise evacuated, at from 90° C. to 180° C., preferably from 100° C. to 170° C., in particular from 110° C. to 160° C., for from 2 to 8 hours, preferably from 3 to 7 hours, in particular from 4 to 6 hours.

In the preferred extrusion process for production of the polyester film, the molten polyester material with the additives is extruded through a flat-film die and quenched in the form of a substantially amorphous prefilm on a chill roll. This film is then reheated and stretched longitudinally and transversely, or transversely and longitudinally, or longitudinally, transversely, and again longitudinally and/or transversely. The stretching temperatures are generally from $T_g+10°$ C. to $T_g+60°$ C. ($T_g$=glass transition temperature), and the longitudinal stretching ratio is usually from 2 to 6, in particular from 2.5 to 4.5, and the transverse stretching ratio is usually from 2 to 5, in particular from 3 to 4.5, and the ratio for any second longitudinal stretching carried out is usually from 1.1 to 3. The first longitudinal stretching may, if appropriate, be carried out simultaneously with the transverse stretching (simultaneous stretching). The heat-setting of the film then follows at oven temperatures of from 200 to 260° C., in particular from 220 to 250° C. The film is then cooled and wound.

The combination of excellent properties gives the inventively produced film excellent suitability for a wide variety of applications, for example for cable insulation, motor insulation, thermal transfer films, interior decoration, for construction of exhibition stands, exhibition requisites, displays, placards, labels, protective glazing for machines and for vehicles, and also in the lighting sector, and the fitting-out of shops and of stores, as a promotional item, as a laminating medium, for food-and-drink applications, medical applications, technical films, capacitors, adhesive tapes, lid films, and many other applications.

The invention is further illustrated by the examples below. In the examples, percentages are percentages by weight unless otherwise stated or otherwise directly discernible from the context.

The properties of the films were tested as follows:

Surface Defects and/or Homogeneous Coloring

Surface defects and/or homogeneous coloring were determined visually.

Mechanical Properties

Modulus of elasticity and ultimate tensile strength were determined longitudinally and transversely to ISO 527-1-2.

SV (DCA), IV (DCA)

Standard viscosity SV (DCA) was determined by methods based on DIN 53726 as a 1% strength by weight solution in dichloroacetic acid (DCA) at 25° C. SV (DCA)=$(\eta_{rel}-1) \times 1000$. Intrinsic viscosity (IV) was calculated as follows from standard viscosity (SV): IV (DCA)=$6.67 \times 10^{-4}$ SV (DCA)+ 0.118.

Each of the examples and comparative examples below concerns single- or multilayer films, extruded as described above.

Example 1

A white monofilm of thickness 350 μm was produced, comprised of a mixture of
9% of clear PET polymer (M04 from KoSa, Germany) with SV of 980,
1% of masterbatch which comprised, alongside PET, 4% of titanium dioxide and 3% of calcium carbonate and had an SV value of 810,
10% of inherent recycled material comprised of 100% of inherently produced cut film; the SV value of the material was 790;
80% of recycled material whose molecular weight had been increased by condensation processes, comprised of 100% of inherently produced recycled material; the SV value of the material was 970.

This film, and its associated inherently produced cut film, had an SV value of 850, and the inherent recycled material produced therefrom had an SV value of 790. The inherent recycled material was treated to give an SV value of 970 via post-condensation in a tumbling dryer.

The total yield during the production of this film (=proportion of salable film, based on extrudate used) was 64%, meaning that 36% of the extrudate was in turn produced in the form of cut film. These conditions gave closure of the raw-material loop.

Example 2

A monofilm of thickness 4.5 μm was produced, comprised of a mixture of
20% of clear PET polymer (RT49 from KoSa, Germany) with an SV value of 810,
12% of masterbatch with an SV value of 810 comprising, alongside PET, 1% by weight of silicon dioxide (SYLOBLOC®, Grace, Germany),
28% of inherent recycled material,
40% of inherent recycled material with an SV value of 810 whose molecular weight has been increased by condensation processes.

Example 3

An ABA film of thickness 12 μm was produced with outer layers (each of thickness 1 μm) comprised of a mixture of
90% of clear PET polymer (RT49 from KoSa, Germany) with an SV value of 810, and
10% of masterbatch with an SV value of 810 comprising, alongside PET, 1% by weight of silicon dioxide (SYLOBLOC®, Grace, Germany), and with a base layer (thickness 10 μm) comprised of a mixture of
40% of clear PET polymer (RT49 from KoSa, Germany) with an SV value of 810,
30% of inherent recycled material, and
30% of inherent recycled material with an SV value of 810 whose molecular weight has been increased by condensation processes.

Example 4

A monofilm of thickness 50 μm was produced, comprised of a mixture of
20% of PET polymer (M80 from KoSa, Germany) comprising, alongside PET, 18% by weight of barium sulfate (BLANC FIXE®, Sachtleben, Germany); the SV value was 810,
40% of inherent recycled material, and
40% of inherent recycled material with an SV value of 810 whose molecular weight has been increased by condensation processes.

Comparative Example C1

Inventive example 1 was repeated, but now without the use of inherent recycled material whose molecular weight has been increased by condensation processes. The following mixing specification was required in order to achieve an SV value of 850 for the film while other properties were identical:
81% of clear PET polymer (M04 from KoSa, Germany) with an SV value of 980,
9% of masterbatch which, alongside PET, comprised 4% by weight of titanium dioxide and 3% by weight of calcium carbonate, and which had an SV value of 810, and 10% of recycled material comprised of inherently produced cut film.

The mixture SV of the mixing specification was, by analogy with inventive example 1, about 950. The reduction in SV value during drying and extrusion for film production was about 100 SV value units, making the SV value of the film 850. The viscosity of the individual polymer components—virgin polymer, masterbatch, and recycled material—was very different, and this drastically impaired the homogeneity of the polymer melt.

Given that the overall yield during film production here was 64%, only 10% of cut film could be returned, and this made film production extremely uneconomic.

Comparative Example C2

Inventive example 1 was repeated. In contrast to inventive example 1, the film of thickness 350 μm comprised 90% by weight of inherent recycled material.

The mixing specification was therefore as follows:
9% of M04 (clear PET polymer from KoSa, Germany) with SV of 980,
1% of masterbatch which comprised, alongside PET, 4% by weight of titanium dioxide and 3% by weight of calcium carbonate and had an SV value of 810,
90% of inherent recycled material comprised of 100% of inherently produced cut film; the SV value of the material was 790.

Although this mixing specification closed the raw-material loop, reliable production of film was not possible.

The table below gives the properties of the films produced in the various examples and comparative examples (C):

|  |  |  | Example | | | | | |
| --- | --- | --- | --- | --- | --- | --- | --- | --- |
|  |  |  | 1 | 2 | 3 | 4 | C1 | C2 |
| Thickness |  |  | 350 | 4.5 | 12 | 50 | 350 | 350 |
| ultimate tensile | longitudinal | [N/mm$^2$] | 190 | 300 | 250 | 150 | 195 |  |
| strength | transverse | [N/mm$^2$] | 230 | 250 | 260 | 240 | 230 |  |
| modulus of | longitudinal | [N/mm$^2$] | 3900 | 5000 | 4200 | 3600 | 4000 |  |
| elasticity | transverse | [N/mm$^2$] | 4200 | 4300 | 5100 | 5200 | 4150 |  |
| Surface defects |  |  | none | none | none | none | none |  |
| Raw-material loop closed? |  |  | yes | yes | yes | yes | no | yes |
| Stability of process* |  |  | o | o | o | o | o | — |

*o = unchanged with respect to standard
— = impaired with respect to standard

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined bye the appended claims and their equivalents.

As used herein and in the following claims, articles such as "the", "a" and "an" can connote the singular or plural.

All documents referred to herein are specifically incorporated herein by reference in their entireties.

What is claimed is:

1. A process for production of a biaxially oriented film which comprises extruding or coextruding a composition comprising (i) at least one crystallizable thermoplastic as main constituent (ii) at least 500 ppm, based on the weight of the thermoplastic, of a pigment, and (iii) a total of from 60 to 100% by weight, based on the weight of the film, of a mixture of recycled material formed entirely from said film, wherein the molecular weight of at least 20% by weight, based on the weight of the film, of recycled material formed entirely from said film within said recycle mixture has been increased by condensation processes prior to said extruding or coextruding step, and said film exhibits a modulus of elasticity in the transverse direction of greater than or equal to 5100 N/mm$^2$, wherein the standard viscosity SV (DCA) of the recycled material has been increased by the condensation process by at least 100 up to the standard viscosity SV (DCA) of said crystallizable thermoplastic prior to said extrusion or coextrusion, and wherein the mixture of recycled material includes from 10 to 40% by weight, based on the weight of the film, of additional recycled material other than the recycled material whose molecular weight has been increased.

2. The process as claimed in claim 1, wherein the thickness of the film is from 2 to 500 μm.

3. The process as claimed in claim 1, wherein, based on the weight of the thermoplastic, up to 25% by weight of at least one pigment are added to the film.

4. The process as claimed in claim 1, wherein the film is a single-layer film produced via extrusion.

5. The process as claimed in claim 1, wherein the film is a multilayer film produced via coextrusion and having at least one core layer and at least one outer layer.

6. The process as claimed in claim 1, wherein the pigment comprises titanium dioxide, barium sulfate, calcium carbonate, kaolin, silicon dioxide and/or an inorganic color pigment or inorganic black pigment.

7. The process as claimed in claim 1, wherein the molecular weight of said recycled material has been increased via melt or solid-phase post-condensation.

8. The process as claimed in claim 1, wherein the standard viscosity SV (DCA) of the recycled material has been increased by the condensation process by at least 100 to 250.

9. The process as claimed in claim 1, wherein said crystallizable thermoplastic, comprises polyethylene terephthalate, polybutylene terephthalate, polyethylene naphthalate, or a mixture thereof.

10. The process as claimed in claim 1, wherein the crystallizable thermoplastics are mixed with additives which stabilize the film with respect to UV radiation, color the film, render the film flame-retardant, render the film sealable, and/or render the film resistant to hydrolysis.

11. The process as claimed in claim 1, wherein, the recycled material is predried after the condensation process which increases its molecular weight.

12. A process for producing biaxially oriented film having a thickness ranging from 4 to 300 microns comprising extruding or coextruding a composition comprising (i) at least one crystallizable thermoplastic and (ii) at least 500 ppm, based on the weight of the thermoplastic, of a pigment,
    wherein said film further comprises from 50 to 100% by weight, based on the weight of the film, of a mixture of recycled material formed entirely from said film,
    the molecular weight of from 20% to 80% by weight, based on the weight of the film, of said recycled material within said recycle mixture has been increased by condensation processes prior to said extruding or coextruding step,
    the mixture of recycled material further includes from 10 to 40% by weight, based on the weight of the film, of additional recycled material other than the recycled material whose molecular weight has been increased,
    said film exhibiting a modulus of elasticity in the transverse direction of greater than or equal to 4200 N/mm$^2$,
    and the standard viscosity SV (DCA) of the recycled material has been increased by the condensation process by at least 100 up to the standard viscosity SV (DCA) of said crystallizable thermoplastic prior to said extrusion or coextrusion.

13. A process according to claim 12, wherein said film includes from 60 to 80% by weight, based on the weight of the film, of a mixture of recycled material formed entirely from said film,
    and the molecular weight of 30 to 40% by weight, based on the weight of the film, of the recycled material formed entirely from said film has been increased by condensation processes prior to said extruding or coextruding step, said film exhibiting a modulus of elasticity in the transverse direction of greater than or equal to 4300 N/mm$^2$.

14. A process for production of a biaxially oriented film which comprises extruding or coextruding a composition comprising at least one crystallizable thermoplastic as main constituent; at least 500 ppm, based on the weight of the thermoplastic, of a pigment; and recycled material,
    said film comprising from 50 to 100% by weight, based on the weight of the film, of a mixture of (i) recycled material formed entirely from said film and (ii) recycled material formed entirely from said film whose molecular weight has been increased by condensation processes prior to said extruding or coextruding step, wherein
    the film has a thickness of less than 4 microns and comprises from 30% to 40% by weight, based on the weight of the film, of said recycled material formed entirely from said film whose molecular weight has been increased or
    the film has a thickness of greater than 300 microns and comprises from 20% to 70% by weight, based on the weight of the film, of said recycled material formed entirely from said film whose molecular weight has been increased and from 10 to 40% by weight, based on the weight of the film, of additional recycled material other than the recycled material whose molecular weight has been increased
    and the standard viscosity SV (DCA) of the recycled material has been increased by the condensation process by at least 100 up to the standard viscosity SV (DCA) of said crystallizable thermoplastic prior to said extrusion or coextrusion.

* * * * *